March 20, 1928.
E. P. ROSS
1,663,351
PROCESS FOR TREATING PIG IRON
Filed Sept. 24, 1926
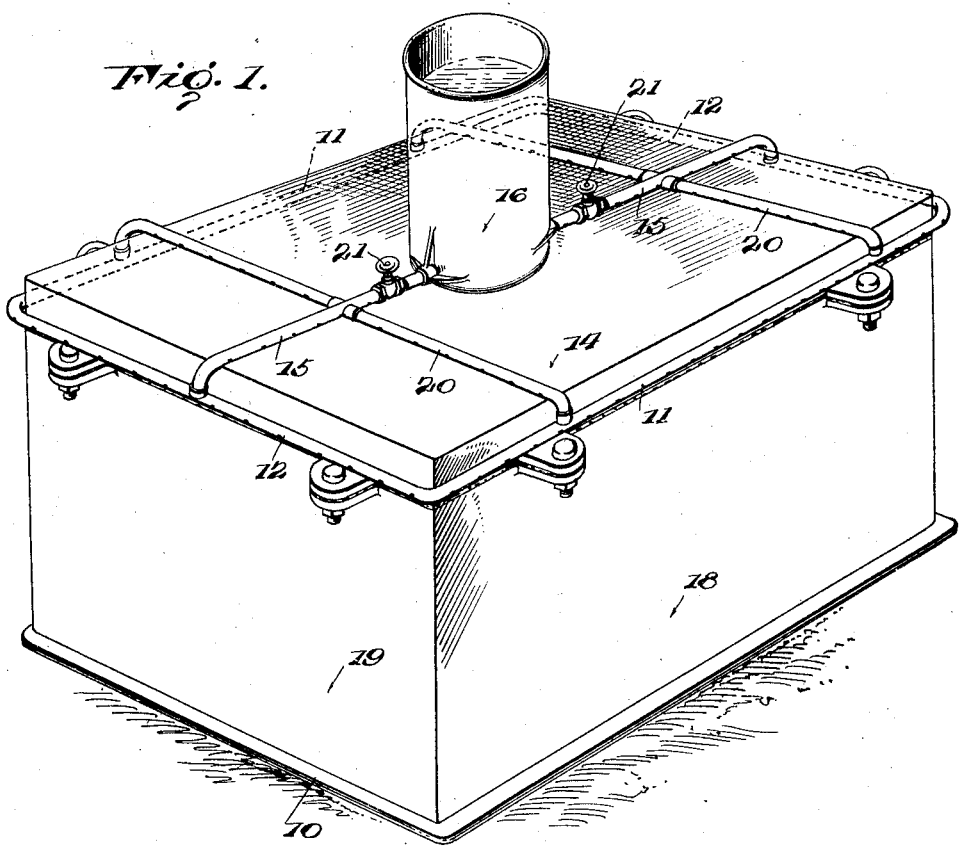
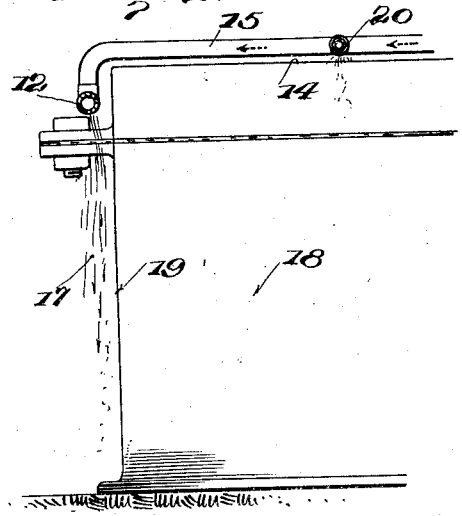
INVENTOR
*E. P. Ross.*
BY
ATTORNEYS Patented Mar. 20, 1928.

1,663,351

UNITED STATES PATENT OFFICE.

EDWARD P. ROSS, OF RIDDLESBURG, PENNSYLVANIA.

PROCESS FOR TREATING PIG IRON.

Application filed September 24, 1926. Serial No. 137,634.

This invention relates to a process for treating pig iron.

An object of the invention is the provision of a process for treating pig iron after the same has been placed in the molds and after the pig iron has been transferred to some conveyance for removing the iron from the blast furnace to that part of the plant where the iron is further treated.

A further object of the invention is the provision of a process for treating pig iron by spraying the molds after the iron has been placed therein from the blast furnace and then spraying the container or car in which the pig iron is carried from the blast furnace to the other parts of the factory, thus permitting the iron to cool slowly and preventing water cracks.

This invention will be best understood from a consideration of the following detailed description, in view of the accompanying drawing, forming a part of the specification; nevertheless it is to be understood that the invention is not confined to the disclosure, being susceptible of such changes and modifications which shall define no material departure from the salient features of the invention as expressed in the appended claim.

Figure 1 is a view in perspective of a conventional form of container for slowly cooling ingots of pig iron, and Figure 2 is a fragmentary end view partly in section of the container.

The iron from the blast furnace is run into the ladle in the usual way and from which it is poured into a train of pig molds known as the pig casting machine. In carrying out my invention the process is continued by spraying the bottoms of the pig molds to chill the iron sufficiently to solidify the same.

The solidifying iron shrinks slightly and water is added to the surface of the "pig" in order to cause it to contract still further so that the pig iron may be readily removed from the mold at the delivery point. After the removal of the pig iron from the molds the iron is either conveyed by chutes from the pig machine to the railroad car or to some other point in the factory for operation. These hot "pigs" are removed from the chutes by an equipment specially prepared for handling the metal. During the conveyance of the iron in the freight cars or in any other form of conveyor by which the "pigs" are transferred from the blast furnace to some other part of the factory, the freight car or conveyance is sprayed continuously on the outside to aid in gradually cooling the iron and no cool fluid is employed during the conveyance of the iron which will come in direct contact with the "pigs". This spraying of the car or other conveyance not only aids in slowly dissipating the heat of the pig iron but also prevents damage to the cars by the intense heat.

By this process the quality of the iron is greatly improved by avoiding the use of direct contact of water for quenching the iron. Therefore the iron does not "water crack" and break up in pieces. The indirect chilling effect of applicant's, readily overcomes the numerous defects in the pig iron and the product more nearly meets the requirements of the old fashioned "sand cast iron" and is therefore soft, opened grained, and has great strength. This treatment of the iron is not only applicable to the pig iron but is applicable to other forms of the iron.

Referring more particularly to the figures it will be seen that a car or container 10 is provided with pipes 11 and 12 secured at the corners adjacent the top 14 of the car. Pipes 15 extending from a reservoir 16 mounted on the top 14 of the car or container are adapted to supply a cooling fluid to the pipes 12 at the end of the car, the pipes 12 being in direct communication with the pipes 11.

These pipes 11 and 12 are provided with a plurality of perforations arranged in spaced relation along the pipes so that as shown at 17 water is sprayed down over the side walls 18 and 19 of the container or freight car, the pig iron being enclosed within the car and out of direct contact with the water being sprayed thereon.

A series of spaced pipes may be employed over the top 14 or along the side walls 18 and 19.

Transverse pipes 20 connected to the pipes 15 and pipes 11 are perforated and are adapted to spray water in connection with pipes 15 on the top of the contaner or car 10. Valves 21 control the flow of the water from the tank 16.

What I claim is:

The process of treating ingots having a temperature of approximately the temperature of pig iron after being poured into a mold, which comprises confining the ingots in a volume of air enclosed by a heat conducting medium and applying a cooling medium to the heat conducting medium for gradually cooling the ingots.

EDWARD P. ROSS.